(12) United States Patent  (10) Patent No.: US 6,996,491 B2
Gold et al.  (45) Date of Patent: Feb. 7, 2006

(54) METHOD AND SYSTEM FOR MONITORING AND PROFILING AN INTEGRATED CIRCUIT DIE TEMPERATURE

(75) Inventors: Spencer M. Gold, Pepperell, MA (US); Claude R. Gauthier, Fremont, CA (US); Steven R. Boyle, Santa Clara, CA (US); Kenneth A. House, Arlington, MA (US); Joseph Siegel, Shrewsbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 309 days.

(21) Appl. No.: 10/079,476

(22) Filed: Feb. 19, 2002

(65) Prior Publication Data

US 2003/0158697 A1 Aug. 21, 2003

(51) Int. Cl.
*G01K 1/08* (2006.01)

(52) U.S. Cl. ...................................... 702/132; 374/178
(58) Field of Classification Search ................ 702/132, 702/130; 374/178; 713/300; 716/4; 347/57, 347/58, 17; 257/467; 714/23; 341/155
See application file for complete search history.

(56) References Cited

U.S. PATENT DOCUMENTS

| | | | |
|---|---|---|---|
| 3,379,214 A | 4/1968 | Weinberg | |
| 4,165,642 A | 8/1979 | Lipp | |
| 4,201,087 A | 5/1980 | Akita et al. | |
| 4,305,041 A | 12/1981 | Frerking | |
| 4,371,271 A | 2/1983 | Bellet | |
| 4,551,031 A | 11/1985 | Ishikawa et al. | |
| 4,559,954 A | 12/1985 | Murase | |
| 4,658,407 A | 4/1987 | Iwama | |
| 4,692,710 A | 9/1987 | Shvartsman | |
| 4,754,760 A | 7/1988 | Fukukita et al. | |
| 4,905,701 A | 3/1990 | Cornelius | |
| 5,085,526 A | 2/1992 | Sawtell et al. | ............... 374/101 |
| 5,097,198 A | 3/1992 | Holmdahl | |
| 5,193,387 A | 3/1993 | Hodate | |
| 5,214,668 A | 5/1993 | Satou et al. | |
| 5,291,607 A | 3/1994 | Ristic et al. | |
| 5,485,127 A | 1/1996 | Bertoluzzi et al. | ............ 331/69 |
| 5,490,059 A | 2/1996 | Mahalingaiah et al. | ..... 364/166 |
| 5,546,810 A | 8/1996 | Arikawa et al. | |
| 5,626,425 A | 5/1997 | Fujikawa et al. | |
| 5,638,418 A | 6/1997 | Douglass et al. | |
| 5,781,075 A | 7/1998 | Bolton, Jr. et al. | |
| 5,781,718 A | 7/1998 | Nguyen | |
| 5,832,048 A | 11/1998 | Woodman, Jr. | |
| 5,836,691 A | 11/1998 | Yamauchi | |
| 5,838,578 A | 11/1998 | Pippin | |
| 5,870,614 A | 2/1999 | Ang | ....................... 395/750.03 |
| 5,873,053 A * | 2/1999 | Pricer et al. | ................. 702/130 |

(Continued)

OTHER PUBLICATIONS

Gunther et al. "Managing the impact of increasing microprocessor power consumption." pp. 1-9 http://www.intel.com/technology/itj/q12001/articles/art_4.htm (2001).

(Continued)

*Primary Examiner*—Michael Nghiem
*Assistant Examiner*—Xiuqin Sun
(74) *Attorney, Agent, or Firm*—Lahive & Cockfield, LLP (57) ABSTRACT

A system and method are provided for sensing a physical stimulus of an integrated circuit. The system and method operate with one or more active thermal sensors embedded in the die of an integrated circuit to provide highly accurate die temperature measurements. The system and method are able to monitor and control the die temperature of the integrated circuit to avoid an integrated circuit malfunction due to an undesirable temperature condition.

29 Claims, 5 Drawing Sheets

U.S. PATENT DOCUMENTS

| | | | |
|---|---|---|---|
| 5,892,408 A | | 4/1999 | Binder |
| 5,892,448 A | | 4/1999 | Fujikawa et al. |
| 5,933,039 A | | 8/1999 | Hui et al. |
| 5,953,640 A | | 9/1999 | Meador et al. |
| 6,098,030 A | * | 8/2000 | McMinn .................... 702/132 |
| 6,104,075 A | * | 8/2000 | Karaki ....................... 257/467 |
| 6,115,441 A | | 9/2000 | Douglass et al. ............. 377/25 |
| 6,219,723 B1 | | 4/2001 | Hetherington et al. ........ 710/18 |
| 6,362,699 B1 | | 3/2002 | Fry |
| 6,363,490 B1 | * | 3/2002 | Senyk ........................ 713/300 |
| 6,370,656 B1 | * | 4/2002 | Olarig et al. ................. 714/23 |
| 6,463,396 B1 | * | 10/2002 | Nishigaki ................... 702/132 |
| 2001/0021217 A1 | * | 9/2001 | Gunther et al. ............. 374/178 |
| 2002/0021239 A1 | * | 2/2002 | Lance et al. ................ 341/155 |
| 2003/0052331 A1 | | 3/2003 | Gauthier et al. |
| 2003/0155903 A1 | | 8/2003 | Gauthier et al. |
| 2003/0155964 A1 | | 8/2003 | Gauthier et al. |
| 2003/0155965 A1 | | 8/2003 | Gauthier et al. |
| 2003/0156622 A1 | | 8/2003 | Gold et al. |
| 2003/0158683 A1 | | 8/2003 | Gauthier et al. |

OTHER PUBLICATIONS

Intel Corporation "Mobile Pentium ® II Processor and Pentium II Processor Mobile Module Thermal Sensor Interface specifications." 13 pages (Apr. 1998) http://www.intel.com/design/mobile/applnots/24372401.pdf.

Dallas Semiconductor, Application Note 105, "High Resolution Temperature Measurement With Dallas Direct-to-Digital Temperature Sensors" Retrieved from the Internet, www.dalsemi.com, pp. 1-20 (Aug. 11, 1999).

Dallas Semiconductor, Product Guide, "DS1721 2-Wire Digital Thermometer and Thermostat" pp. 1-14 (Dec. 29, 1998).

Intel Corporation 2000, Product Guide "Intel® Pentium® 4 Processor In the 423-pin Package Thermal Design Guidelines" Order No.: 249203-001, pp. 1-28 (Nov. 2000).

Maxim Integrated Products "Maxim Remote/Local Temperature Sensor with SMBus Serial Interface: MAX1617" pp. 1-20 (Mar. 1998).

* cited by examiner

METHOD AND SYSTEM FOR MONITORING AND PROFILING AN INTEGRATED CIRCUIT DIE TEMPERATURE

REFERENCE TO RELATED APPLICATIONS

The present invention relates to five other applications filed on the same date: An Integrated Temperature Sensor application Ser. No. 10/080,037, A Controller for Monitoring Temperature application Ser. No. 10/079,475, Quantifying a Difference Between Nodal Voltages application Ser. No. 10/078,945, Low Voltage Temperature Independent and Temperature Dependent Voltage Generator application Ser. No. 10/078,140 and Temperature Calibration Using On-Chip Electrical Fuses application Ser. No. 10/078,760.

TECHNICAL FIELD OF THE INVENTION

The present invention generally relates to an integrated circuit, and more particularly, to a system and method to monitor the temperature of an integrated circuit.

BACKGROUND OF THE INVENTION

Temperature gradients across the dies of conventional high performance very large scale integration (VLSI) components, such as a microprocessor, can adversely affect component performance. For example, a temperature variation between two clock driver circuits within a microprocessor often results in a skew in the system clock of the microprocessor. Moreover, the die of the microprocessor may reach an unacceptable temperature that causes the microprocessor to malfunction or stop functioning.

A diode is often placed in a die of the microprocessor to provide a die temperature indication. This diode is driven with a fixed amount of current, and the corresponding voltage drop across the diode provides an indication of the microprocessor temperature. Unfortunately, the diode provides a temperature reading that can be accurate to about only ±10° C., which is often not accurate enough to provide an early indication of a temperature abnormality. Moreover, a single diode is typically utilized to monitor the die temperature of the entire microprocessor. Given the size and complexity of current and future microprocessors, it is impossible to determine and monitor a temperature gradient across the microprocessor using only a single diode positioned at a location in the die of a microprocessor. As such, substantial variations in temperature across the die of the microprocessor can go undetected. Consequently, any indication that a thermal gradient problem exists in a portion of the integrated circuit go undetected.

SUMMARY OF THE INVENTION

The present invention addresses the above-described limitations of monitoring the temperature of an integrated circuit. The present invention provides an approach to monitor the temperature of an integrated circuit to provide an early indication of a possible thermal related problem in the integrated circuit.

In one embodiment of the present invention, a system to monitor the temperature of an integrated circuit is provided. The system is adapted to include an active thermal sensor that can be located at one or more die locations to measure the temperature of the integrated circuit and assert a value that is representative of the measured temperature. The asserted value is received by a controller coupled to the active thermal sensor and interprets the asserted value to monitor and control the temperature of the integrated circuit. The system can also be adapted to include an active thermal calibration sensor that operates independently from the active thermal sensor to perform a calibration temperature measurement on the integrated circuit. The system can further be adapted to include a passive thermal sensor to measure the temperature of the integrated circuit. The passive thermal sensor, asserts a voltage value that is representative of the temperature of the integrated circuit at the location of the passive thermal sensor.

The above-described approach provides an integrated circuit with a system to monitor the integrated circuit's temperature profile and to detect a temperature rise in a particular area of the integrated circuit before a temperature-related failure occurs. As a result, early detection of an elevated temperature before a temperature-related malfunction occurs allows the system to execute an appropriate response to compensate for the elevated temperature and avoid the temperature-related malfunction. Consequently, temperature abnormalities in an integrated circuit can now be more easily detected. In this manner, active thermal sensors can be placed at multiple die locations in an integrated circuit to accurately track and monitor the thermal gradient of an integrated circuit.

In accordance with another aspect of the present invention, a method is performed for monitoring a die temperature of an integrated circuit. The method senses the die temperature of the integrated circuit with an active thermal sensor at one or more locations situated across the die of the integrated circuit. Each active thermal sensor asserts a value that is representative of the sensed die temperature to a controller coupled to each active thermal sensor. The controller determines if the value asserted by each of the active thermal sensors exceeds a threshold value associated with each active thermal sensor to detect an undesirable temperature condition, for example an over temperature condition or an under temperature condition, in the integrated circuit. If one of the asserted values exceeds or falls below its associated threshold value, the controller is capable of reading a memory structure to determine an appropriate response to the undesirable temperature condition. To filter false alarms, the method is configurable to wait for a number of undesirable temperature indications from a particular active thermal sensor before reading the contents of the data structure.

The above-described approach benefits an integrated circuit, such as a very large scale integration (VLSI) circuit, such as for example, a microprocessor. As a consequence, the integrated circuit is able to monitor and react to an unacceptable die temperature measurement from an active thermal sensor embedded in the integrated circuit thus preventing the integrated circuit from malfunctioning or halting altogether. In addition, accurate temperature profiling of a VLSI circuit, such as a microprocessor can be accomplished as the microprocessor executes various code streams. Moreover, the above-described approach provides a technique to filter erroneous temperature transients and thereby avoid an unnecessary response.

In yet another embodiment of the present invention, a temperature management system for an integrated circuit is provided. The temperature management system includes one or more thermal sensors to sense and report one or more temperature measurements from one or more locations across a die area of an integrated circuit. The temperature management system also includes a control unit to manage the temperature of the integrated circuit if the control unit detects a temperature event based on a value from the one or more thermal sensors. The temperature management system can also be adapted to include a calibration thermal sensor that operates independently of the one or more thermal sensors. The calibration thermal sensor provides one or more temperature calibration values for the one or more thermal sensors. The one or more temperature calibration values are used by the control unit to determine if the one or more thermal sensors detect a temperature event. The active thermal sensors along with the calibration thermal sensor are embedded in the die of an integrated circuit.

BRIEF DESCRIPTION OF THE DRAWINGS

An illustrative embodiment of the present invention will be described below relative to the following drawings.

DETAILED DESCRIPTION

For purposes of the discussion below, it is helpful to clarify the meaning of a few terms.

As used herein, an "active thermal sensor" and an "active calibration thermal sensor" refer to a thermal sensor that requires a source of energy for its operation.

As used herein, a "passive thermal sensor" refers to a thermal sensor that does not require a source of energy for its operation, for example, an electrical resistor, a diode or other like device.

As used herein, "calibration" or "calibrate" refers the act or process of determining or measuring one or more temperature measurements while the majority of the circuitry in the integrated circuit is in a non-clocked state.

The illustrative embodiment of the present invention provides a temperature monitoring system for an integrated circuit that provides one or more die temperature measurements of the integrated circuit to actively monitor and control the die temperature across the integrated circuit. In the illustrative embodiment, the temperature monitoring system includes at least one thermal sensor that is configured as an active device to sense a die temperature of an integrated circuit and a controller to determine if the temperature sensed by the active thermal sensor indicates an undesirable temperature condition in the integrated circuit.

In the illustrative embodiment, the temperature monitoring system is attractive for use in integrated circuits that desire highly accurate and reliable die temperature measurements. Each thermal sensor in the system operates in an independent manner, that is, without disturbing other operations being concurrently performed in the integrated circuit. Consequently, each thermal sensor is able to accurately sense and report a temperature value regardless of any change in system clock frequency of the integrated circuit. Moreover, each thermal sensor can be adapted to operate with or without an independent current or voltage source depending on the application.

Each thermal sensor independently reports a die temperature measurement to a system controller so that a comprehensive temperature measurement of an integrated circuit can be obtained to avert an undesirable temperature condition. The temperature monitoring system of the illustrative embodiment also provides an independent calibration thermal sensor. The independent calibration thermal sensor performs a calibration baseline measurement on itself while the integrated circuit is configured to prevent self-heating. Self-heating refers to the thermal dissipation in the integrated circuit when one or more devices in the integrated circuit are powered on, but not necessarily performing their designed function.

The illustrative embodiment of the present invention allows for an active thermal sensor to be embedded in multiple die locations across the die of an integrated circuit, such as a microprocessor, to permit thermal profiling of the microprocessor as it executes various functions. The active thermal sensor operates without hindering or interfering with the operation of the microprocessor as it processes data and instructions. In this manner, the active thermal sensor operates independently of the microprocessor to provide a highly accurate temperature measurement as the microprocessor processes data and instructions irrespective of the clock frequency at which the microprocessor is operating.

Figure 1:
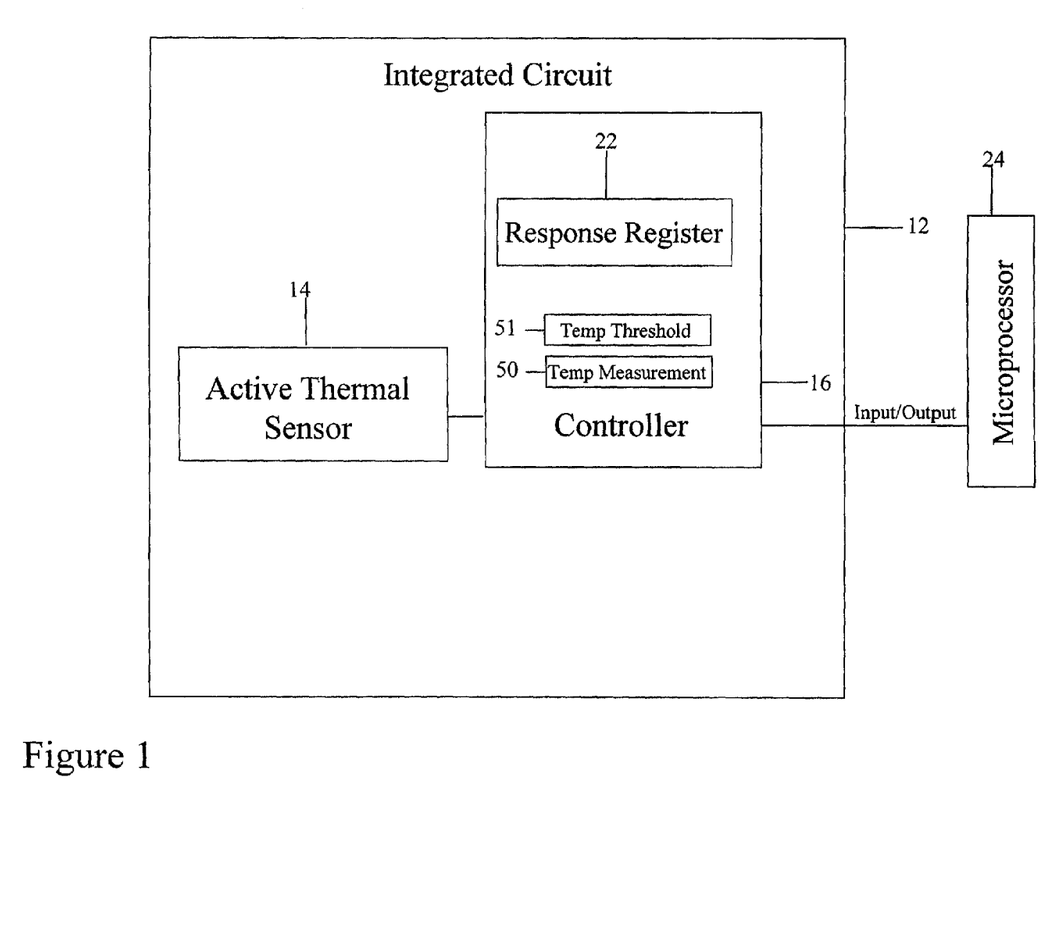
FIG. 1 depicts a block diagram of an exemplary integrated circuit having an active thermal sensor and a controller that are suitable for practicing the illustrative embodiment of the present invention.

FIG. 1 is a block diagram of an exemplary integrated circuit 12 that is suitable for practicing the illustrative embodiment of the present invention. The exemplary integrated circuit 12 is adapted to include an active thermal sensor 14 coupled to a controller 16. The active thermal sensor 14 senses a die temperature of the exemplary integrated circuit 12 and reports a value, which is typically digital, to the controller 16 that represents the sensed die temperature at the location of the active thermal sensor 14. The controller 16 receives the sensed temperature value from the active thermal sensor 14 in serial fashion. The controller 16 monitors the sensed temperature value for an unacceptable temperature indication. The controller 16 is adapted to include one or more input and output ports that are coupled to a processor 24, a response register 22, one or more temperature measurement registers 50 and one or more temperature threshold registers 51.

The processor 24 provides the controller 16 with a multitude of information, such as calibrated temperature threshold values for use by the controller 16 to determine if the value reported by the active thermal sensor 14 indicates an undesirable temperature condition or event. Nevertheless, one skilled in the art will recognize that the calibrated temperature threshold values can be provided to the controller 16 in any suitable manner, for example upon power on or as part of a reset sequence or command. The controller 16 holds the calibrated temperature threshold values in the one or more temperature threshold registers 51. The controller 16 is adapted to include one temperature threshold register 51 for each active thermal sensor 14 embedded in exemplary integrated circuit 14, although in some applications a single temperature threshold register 51 for use with multiple active thermal sensors 14 may be sufficient. Typically, the calibrated temperature threshold values are empirically derived from tests or measurements of the processor 24 during manufacturing. The processor 24 also provides the controller 16 with information concerning the number of over-temperature indications that need to be detected and reported by the active thermal sensor 14 before a response is necessary. In addition, the processor 24 loads the response register 22 with the particular type of response the controller 16 should execute if the over-temperature indication is determined to be outside an acceptable limit. The response register 22 is discussed below in more detail relative to FIG. 2. Those skilled in the art will All recognize that the processor 24 can be configured to support the application, for example, a service processor, a microprocessor and the like. Nevertheless, those skilled in the art will appreciate that the processor 24 can be a device not integrated into the exemplary integrated circuit 12 so that the processor 24 is "off-chip".

The temperature measurement register 50 is a storage element that stores the response from the active thermal sensor 14 for the controller 16. The controller 16 typically shifts the content of the temperature measurement register 50 to the processor 24 when polled by the processor 24. Those skilled in the art will recognize that the response from the active thermal sensor 14 can be processed or manipulated before being stored in a temperature measurement register. For example, a number of bits may be stripped off to reduce the size of the register without impacting measurement accuracy.

The active thermal sensor 14 is configured so that measurement accuracy is not impacted by a change in the system clock frequency utilized by other circuits and devices within the exemplary integrated circuit 12. The active thermal sensor 14 can be placed in multiple locations across the die of the exemplary integrated circuit 12. Consequently, more than one active thermal sensor 14 can be embedded in the die of the exemplary integrated circuit 12. As such, one active thermal sensor 14 can be embedded at a die location that is expected to have the greatest amount of thermal dissipation while a second active thermal sensor 14 can be embedded at a die location that is expected to have the least amount of thermal dissipation. In this manner a highly accurate thermal profile of an integrated circuit can be measured and monitored.

The active thermal sensor 14 senses and reports a temperature value that represents either an absolute or relative die temperature-at the sensor's location. The value reported by the active thermal sensor 14 is a digital value typically containing 11 bits with a measurement accuracy of ±1.5° C. Those skilled in the art will recognize that the active thermal sensor 14 can be adapted to report a data unit with more than eleven bits of data or less than eleven bits of data without departing from the scope of the illustrative embodiment of the present invention. Moreover, those skilled in the art will recognize that the active thermal sensor 14 can be adapted to report an analog value that can be digitized.

In operation, the controller 16 interfaces with the processor 24 to determine if a temperature condition or event exists, such as an over-temperature event or an under temperature event. The controller 16 is able to react to a temperature condition or event before a loss of functionality in the exemplary integrated circuit 12 occurs due to an unacceptable thermal condition. Typically, the controller 16 utilizes a variable measurement window of temperature measurements to determine whether a temperature condition or event exists at a die location within the exemplary integrated circuit 12. The controller 16 performs a comparison of a current response from an active thermal sensor 14 with a unique temperature threshold value associated with the reporting active thermal sensor 14. The unique temperature threshold value for the particular active thermal sensor 14 is provided to the controller 16 by the processor 24 and held in the temperature threshold register 51. Moreover, those skilled in the art will appreciate that the controller 16 can be adapted to store one or more temperature threshold values permanently, for example with fuses.

The controller 16 utilizes the measurement window provided by the processor 24 to filter out erroneous temperature measurements from the active thermal sensor 14. The measurement window provided by the processor 24 indicates to the controller 16 the number of responses from the active thermal sensor 14 that need to exceed the established threshold value for that particular active thermal sensor before the controller 16 seeks to execute a response to prevent the exemplary integrated circuit 12 from malfunctioning. The number of responses or the size of the measurement window can be determined through various statistical techniques, such as standard deviation and the like, through trial and error or through any other suitable technique to filter or remove an erroneous fault indicator, such as a statistical outlier. Those skilled in the art will recognize that the measurement window can be adapted to provide the controller 16 with an upper control limit (UCL) and a lower control limit (LCL) to filter out responses that are either above the UCL or below the LCL. Moreover, the size of the measurement window or the number of responses relied upon to indicate a temperature event can be based on a number of consecutive responses or measurements, a number of responses or measurements that exceed the threshold value during a period of time or a number of samples for example, three out of the last five responses, or any other suitable technique to avoid executing an unnecessary response.

Figure 2:
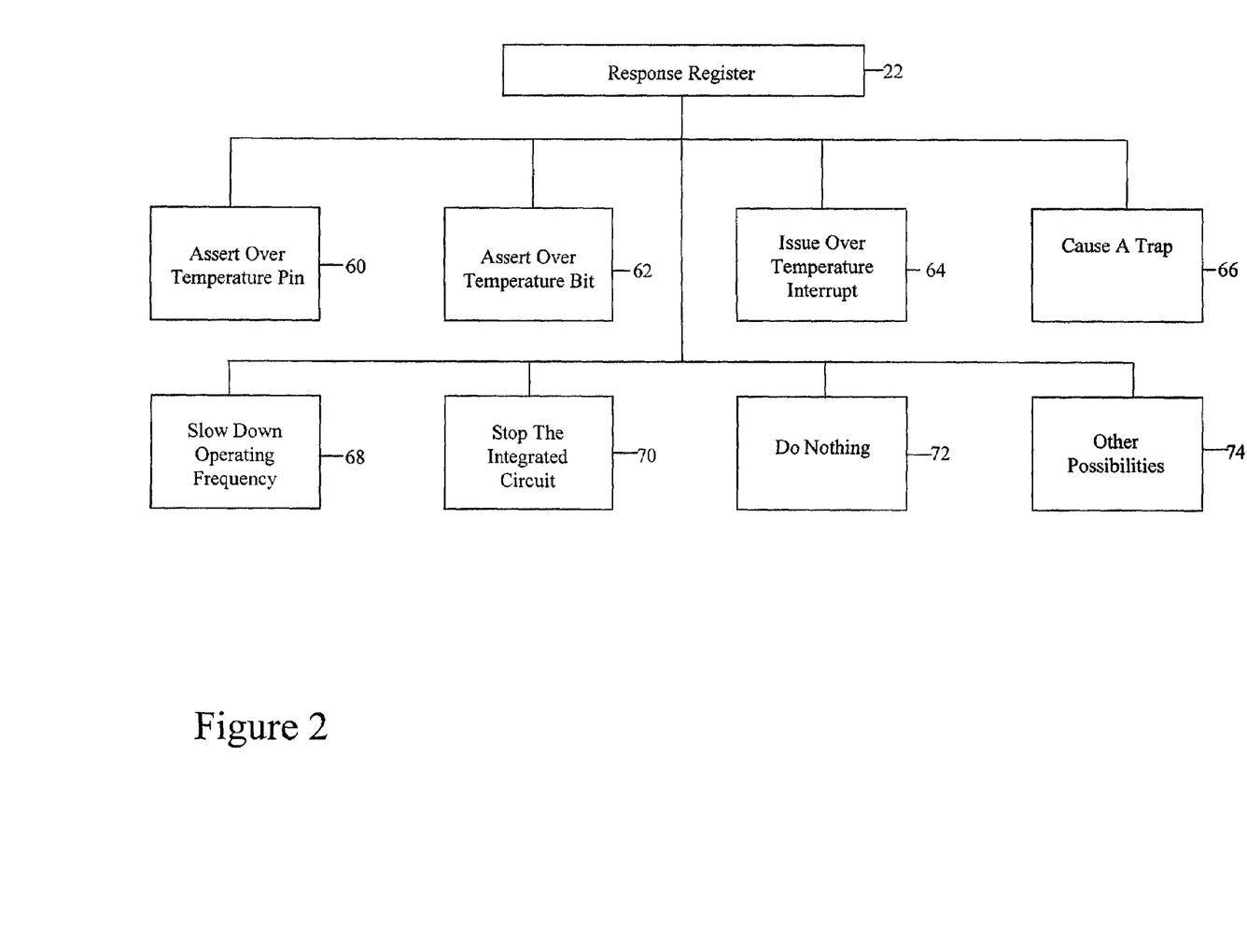
FIG. 2 illustrates the actions that can be taken if an undesirable temperature indication is detected.

FIG. 2 illustrates the type of responses the controller 16 can execute when a reported temperature value either exceeds or falls below a temperature threshold for a sufficient number of measurements. Typically, the response is determined by the content of the response register 22. A write from the processor 24 is one suitable manner for providing the content of the response register 22. Optionally, other suitable manners are available for providing the content of the response register 22, for example, electronic fuses. Actions that the controller 16 can execute upon determination that a reported temperature value either exceeds or falls below its threshold value include, but are not limited to, assert an over-temperature pin 60 of the exemplary integrated circuit 12, assert an over-temperature bit 62 in an error register of the controller 16 or the exemplary integrated circuit 12 or the processor 24, issue a temperature interrupt 64 to a service bus or another interrupt output of the exemplary integrated circuit 12, cause a trap 66, slow down the operating frequency 68 of the exemplary integrated circuit 12, stop 70 the exemplary integrated circuit 12, do nothing 72, or other possibilities 74, such as an architectural power throttle where the exemplary integrated circuit 12 is alternately running or stopped to reduce average power.

Those skilled in the art will recognize that the list of options the controller 16 can execute upon determination that a reported temperature measurement either exceeds or falls below the temperature threshold value is merely exemplary and that other response possibilities 74 can be executed by the controller 16 in response to a detection of an undesirable temperature condition or event. Moreover, the controller 16 can be adapted to follow a decision tree or decision table in response to detection of an undesirable temperature condition or event or adapted to provide an indicator that indicates the undesirable temperature condition or event has been abated.

Figure 3:
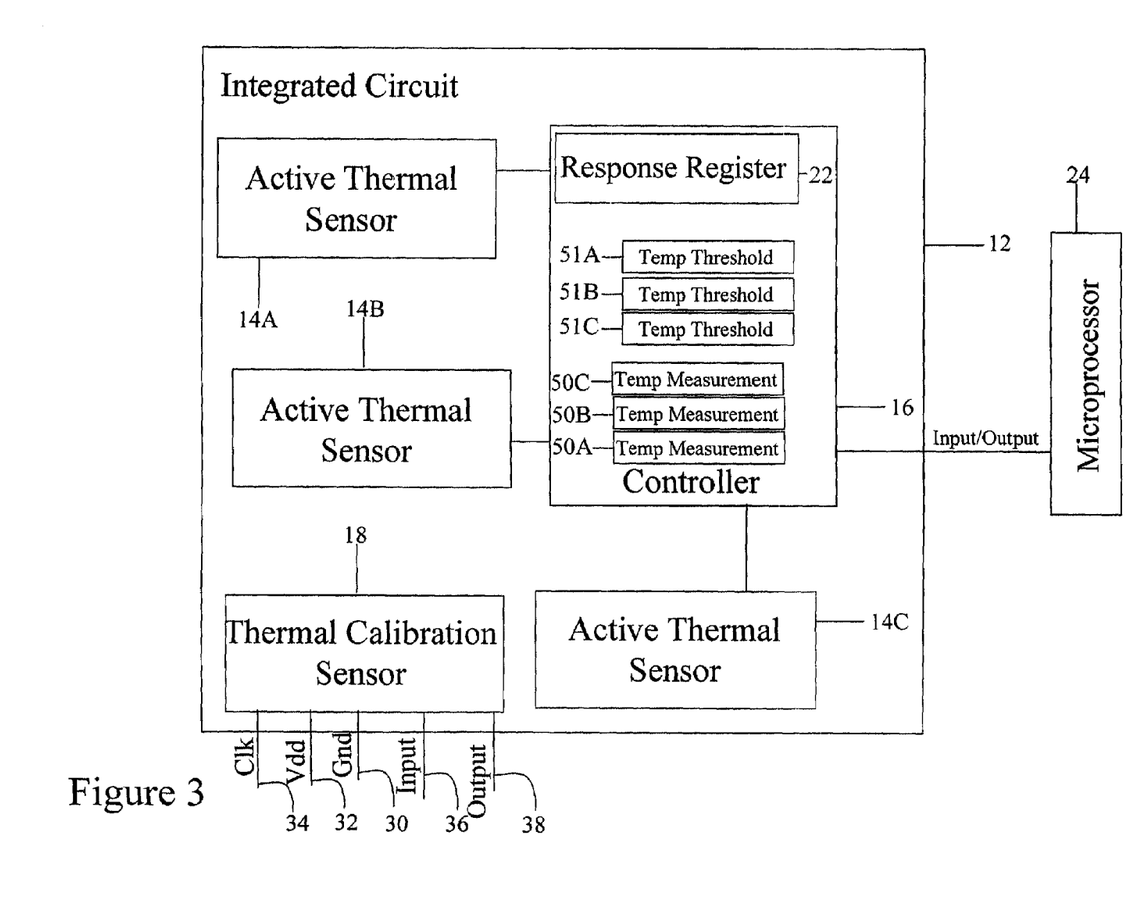
FIG. 3 illustrates a block diagram of an exemplary integrated circuit having more than one active thermal sensor, a calibration sensor and a controller for practicing an illustrative embodiment of the present invention.

FIG. 3 illustrates the exemplary integrated circuit 12 configured to include more than one active thermal sensor 14 coupled to the controller 16. As illustrated, active thermal sensors 14A, 14B and 14C are embedded at various die locations of the exemplary integrated circuit 12 to sense a physical stimulus at multiple discrete locations. Those skilled in the art will recognize that the active thermal sensors 1 4A, 14B and 14C are like active thermal sensors and operate in the same manner to sense and report a value that indicates an absolute or relative die temperature at each sensor's location. In this manner, thermal profiling of the exemplary integrated circuit 12 can be readily accomplished. The benefit of thermal profiling can be significant especially when the exemplary integrated circuit 12 is a microprocessor that executes various code streams.

The controller 16 stores each response from each of the active thermal sensors 14A, 14B and 14C in separate registers within the controller 16, for example, temperature measurement registers 50A, 50B and 50C. The controller 16 is able to send the content of each of the temperature measurement registers 50A, 50B and 50C directly to the processor 24, for example, by polling or any other suitable technique for transferring data. Moreover, for each of the active thermal sensors 14A, 14B and 14C the processor 24 provides a unique temperature threshold value that is suited to each sensor's location in the die of the exemplary integrated circuit 12. Each unique temperature threshold value is held in separate registers within the controller 16, for example, temperature threshold registers 51A, 51B and 51C. Those skilled in the art will appreciate that a common temperature threshold value can be used in place of a unique temperature threshold value for each active thermal sensor.

The exemplary integrated circuit 12 can also be configured to include a thermal calibration sensor 18. The thermal calibration sensor 18 is an active thermal sensor, similar to the active thermal sensor 14, that is able to sense a physical stimulus and report a response corresponding to an absolute or relative value of the physical stimulus. The thermal calibration sensor 18 senses a physical stimulus in the same manner and with the same measurement accuracy as the active thermal sensor 14. Nevertheless, the thermal calibration sensor 18 is independent of any active thermal sensor 14 embedded in the die of the exemplary integrated circuit 12.

The thermal calibration sensor 18 includes a clock-input node 34, a power input node 32, a ground node 30, an input node 36 and an output node 38. The input node 36 and the output node 38 provide the thermal calibration sensor 18 with an interface external to the exemplary integrated circuit 12. The power input node 32 is tied to a voltage source that can be controlled independently of any voltage source supplying a voltage signal to other active devices within the exemplary integrated circuit 12. The clock node 34 is also coupled to a clock source or driver that can be controlled independently of any other clock source or driver within the exemplary integrated circuit 12. In this manner, the thermal calibration sensor 18 can be operated independently of the exemplary integrated circuit 12. Thus, for calibration purposes, a baseline temperature of the thermal calibration sensor 18 can be measured or determined that is representative the die temperature of the exemplary integrated circuit 12 in a non-clocked state. Thus, temperature threshold values for each active thermal sensor 14A, 14B, and 14C can be determined without having to compensate for the thermal affects of having one or more other active elements on or operating within the exemplary integrated circuit 12 during active baselining.

Optionally, the calibration sensor 18 and the active thermal sensor 14 can be implemented with like circuit configurations except for an interface portion of the calibration sensor 18. Typically, the calibration sensor 18 reports a sensed temperature value directly "off-chip", although each active thermal sensor 14 can also be adapted to report a sensed temperature value directly "off-chip". The use of like circuit configurations for the calibration sensor 18 and the active thermal sensor 14 allows for the development or measurement of one or more calibration temperature measurements that can be equally applied to each active thermal sensor 14 implemented. Furthermore, the use of like circuit configurations simplifies layout and manufacture of an integrated circuit embodying a temperature monitoring system illustratively described herein.

Figure 4:
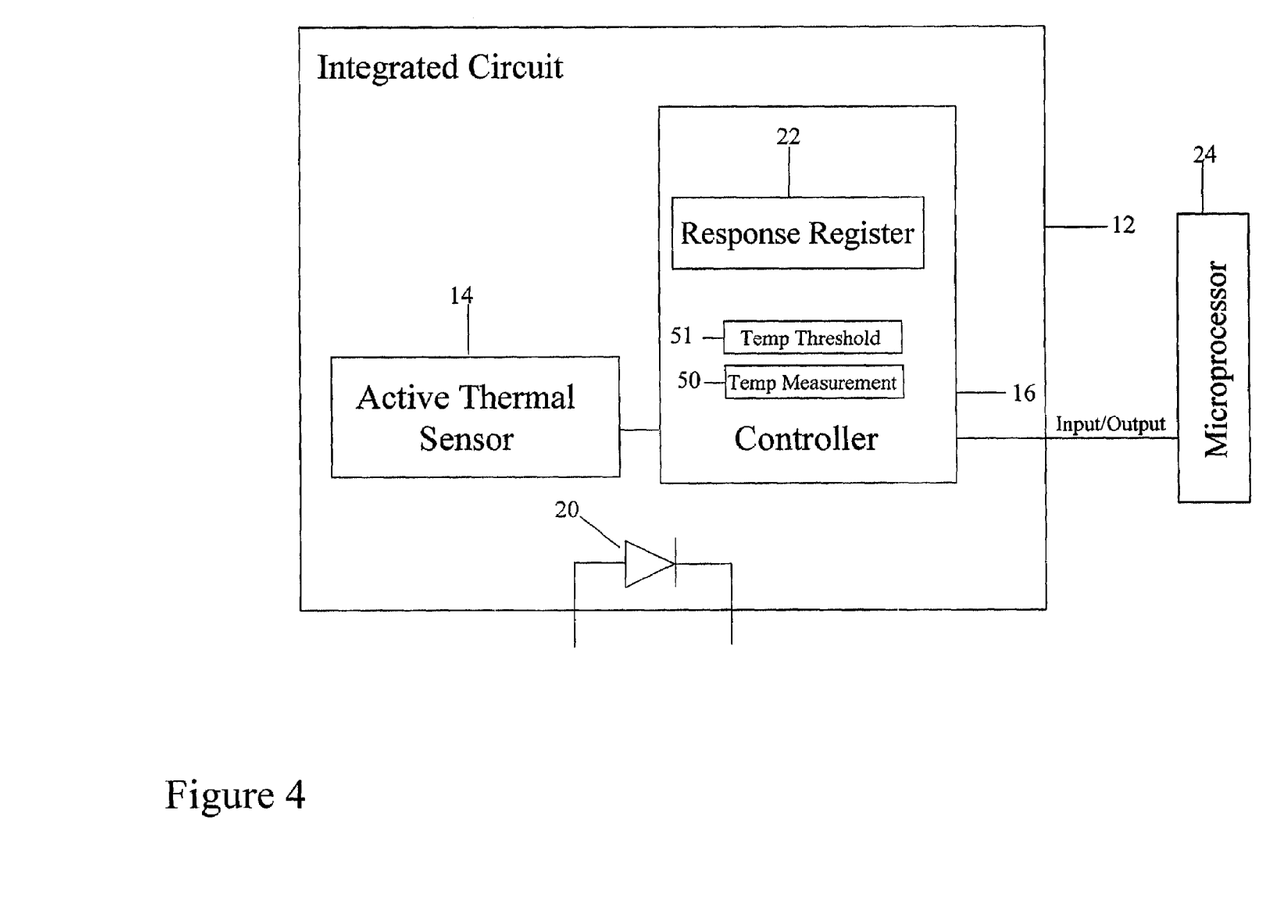
FIG. 4 illustrates a block diagram of an exemplary integrated circuit having an active thermal sensor, a passive thermal sensor, and a controller suitable for practicing the illustrative embodiment of the present invention.

FIG. 4 illustrates that the exemplary integrated circuit 12 can also be adapted to include a passive thermal sensor 20. Typically, the passive thermal sensor 20 is a diode coupled to a current source (not shown) that supplies a fixed amount of current. The passive thermal sensor 20 is able to provide a die temperature indication of the exemplary integrated circuit 12 based on the voltage potential generated across its two terminals. As such, the voltage potential across the two terminals of the passive thermal sensor 20 decreases in value as the die temperature of the exemplary integrated circuit 12 increases. In this manner, the illustrative embodiment of the present invention can provide at least three discrete and independent thermal sensors to monitor the die temperature of the exemplary integrated circuit 12. Consequently, the illustrative embodiment of the present invention provides a robust and reliable technique to monitor and control the die temperature of an integrated circuit.

If the passive thermal sensor 20 is implemented as a diode, which is a non-linear device that exhibits a non-linear voltage versus temperature relationship output, the output of the passive thermal sensor 20 may be optionally conditioned to exhibit a linear voltage versus temperature relationship. For example, the output of the diode can be linearized digitally with one or more registers or with points along a diode temperature curve for use as a comparison.

Figure 5:
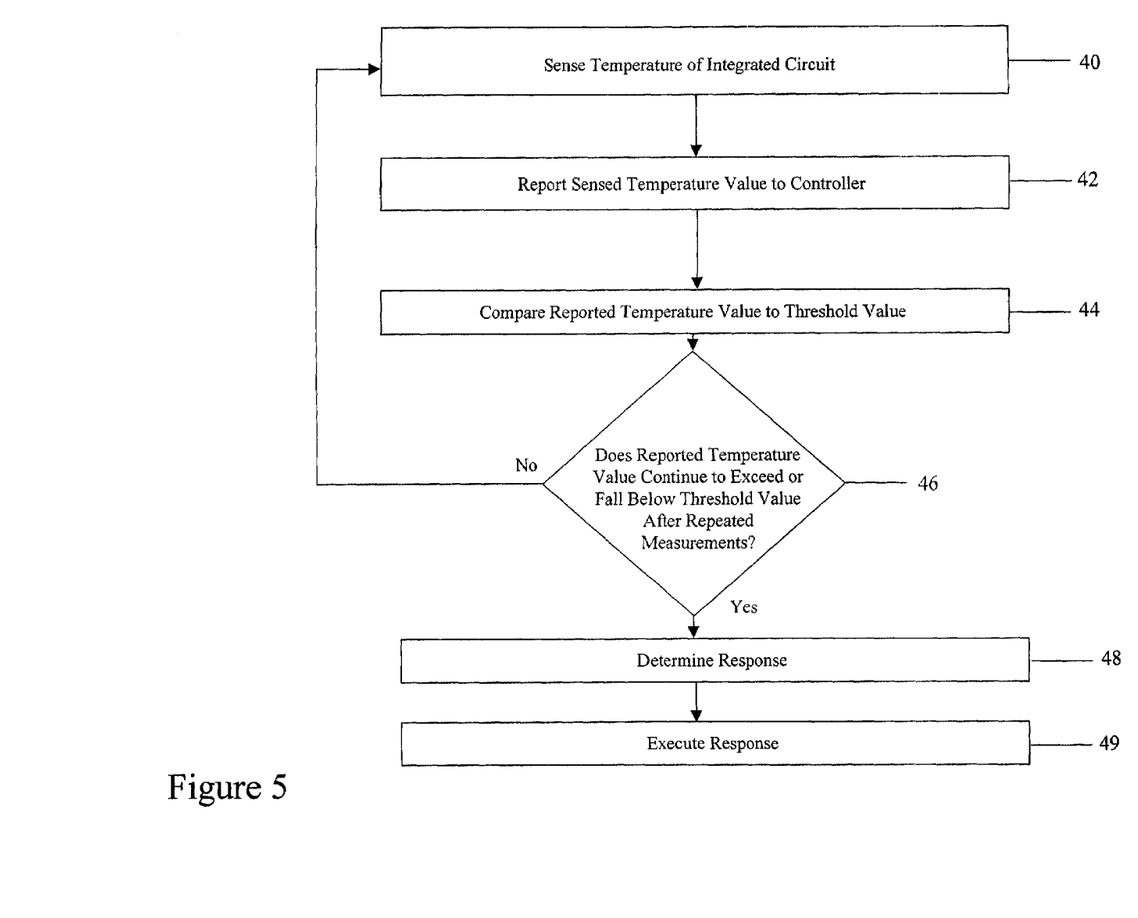
FIG. 5 is a flow diagram illustrating steps taken for practicing an illustrative embodiment of the present invention.

FIG. 5 illustrates the steps taken to monitor and control the die temperature of the exemplary integrated circuit 12. Each active thermal sensor 14 senses a physical stimulus, such as thermal energy at the location of the active thermal sensor 14 (step 40). Each active thermal sensor 14, in turn reports a response value corresponding to either an absolute or relative value of the sensed physical stimulus to the controller 16 (step 42). The controller 16 stores the response value in a temperature measurement register 50 assigned to the reporting active thermal sensor 14 and compares the reported response value to a corresponding threshold value held in a temperature threshold register 51 associated with the particular reporting active thermal sensor 14 to determine if the reported response value either exceeds or falls below the corresponding threshold value (step 44). If the reported response value does not exceed or fall below the threshold value for that particular active thermal sensor 14, the controller 16 takes no further action (step 46).

If the controller 16 determines that the reported response value from the particular reporting active thermal sensor 14 either exceeds or falls below the corresponding threshold value for that particular active thermal sensor 14, the controller 16 initiates a count to determine the number of responses from that particular active thermal sensor 14 that exceed or fall below its corresponding threshold value (step 46). If after a number of responses, the response from the particular active thermal sensor 14 still exceeds or falls below the corresponding threshold value for that active thermal sensor 14, the controller 16 reads the response register 22 to determine the appropriate response (step 48). The controller 16 then executes the response indicated by the content of the response register 22 to avert a loss of functionality in the exemplary integrated circuit 12 (step 49). A partial list of responses that the controller 16 can execute is discussed above in more detail with reference to FIG. 2. Nevertheless, those skilled in the art will recognize that the controller 16 can be instructed to read the response register 22 and execute the response as indicated by the content of the response register 22 upon the detection of a single response from a particular active thermal sensor that either exceeds or falls below the corresponding threshold value for that particular active thermal sensor. A thermal sensor suitable for use in the illustrative embodiment of the present invention is described in U.S. patent application Ser. No. 10/080,037, entitled Integrated Thermal Sensor, which is hereby incorporated by reference. A controller suitable for use in the illustrative embodiment of the present invention is described in U.S. patent application Ser. No. 10/079,475, entitled A Controller For Monitoring Temperature, which is hereby incorporated by reference.

While the present invention has been described with reference to a preferred embodiment thereof, one skilled in the art would appreciate that changes in form and detail may be made without departing from intended scope of the present invention as defined in the pending claims. For example, each active thermal sensor can be configured to assert a signal to indicate to the controller that a current die temperature value is available. Moreover, the functions provided by the microprocessor can be incorporated into the controller to further reduce the number of off chip interfaces. In addition, the active thermal sensors and the controller can communicate in either a uni-directional or bi-directional manner, and each active thermal sensor and the controller can be coupled to a scan chain to provide additional control and observation of the temperature sensing system. Further, the active thermal sensor can be adapted to include a point-to-point synchronous interface to the controller or adapted so that each active thermal sensor and the controller are all coupled to a serial communication link for efficient communication.

What is claimed is:

1. A system to monitor a temperature of an integrated circuit, comprising:
    an active thermal sensor located on a die of said integrated circuit to measure said temperature of said integrated circuit and assert a value representative of one of an over-temperature condition, an under-temperature condition, and a temperature condition between said over-temperature condition and said under-temperature condition; and
    a controller located on the die of said integrated circuit and coupled to said active thermal sensor to interpret said value asserted by said active thermal sensor to monitor said temperature of said integrated circuit, the controller having an interface to a microprocessor for communication with said microprocessor to control the temperature of said integrated circuit.

2. The system of claim 1, further comprising an active calibration sensor that operates in a manner independent of said thermal sensor to perform a calibration temperature measurement of said active calibration sensor and by inference the thermal sensor, wherein said calibration temperature measurement is a baseline calibration of the active calibration sensor in a state where power is applied to only the active calibration sensor either before or after packaging of the integrated circuit.

3. The system of claim 2, wherein integrated circuit includes a substrate and wherein said active calibration sensor is built onto said substrate of said integrated circuit.

4. The system of claim 1, farther comprising a passive thermal sensor to measure said temperature of said integrated circuit and assert a voltage value representative of said temperature of said integrated circuit.

5. The system of claim 4, wherein said passive thermal sensor comprises a diode that provides an analog indication of the temperature of the integrated circuit.

6. The system of claim 5, wherein the analog indication is linearized in a digital manner to provide a linear voltage temperature relationship for the diode.

7. The system of claim 1, wherein said thermal sensor and said controller communicate in a digital manner to measure said temperature of said integrated circuit.

8. The system of claim 1, wherein the controller comprises,
    a first memory structure to hold said value asserted by said thermal sensor; and
    a second memory structure to hold a value that indicates to the controller a response which enables control of the temperature of the integrated circuit.

9. The system of claim 1, wherein said temperature indicates a die temperature of said integrated circuit.

10. The system of claim 1, wherein said controller is coupled to a plurality of thermal sensors to interpret said value asserted by each of said plurality of thermal sensors to monitor and control said temperature of said integrated circuit.

11. The system of claim 1, wherein said integrated circuit includes a substrate and wherein said thermal sensor is built onto said substrate of said integrated circuit.

12. The system of claim 1, wherein said integrated circuit comprises a microprocessor.

13. The system of claim 1, wherein said thermal sensor comprises an active integrated thermal sensor.

14. A method for monitoring a die temperature of an integrated circuit, said method comprising the steps of:
    sensing said die temperature of said integrated circuit with an active thermal sensor at a die location of the integrated circuit;
    asserting from said active thermal sensor a value representative of said die temperature at the die location of said active thermal sensor;
    determining if said value from said active thermal sensor exceeds a threshold value for said active thermal sensor to detect an undesirable temperature condition of said integrated circuit; and
    determining said threshold value with a calibration thermal sensor that operates independently of said active thermal sensor when said integrated circuit is not clocked.

15. The method of claim 14, further comprising the steps of,
    accessing a memory structure if said value representative of said die temperature from the active thermal sensor exceeds said threshold value for the active thermal sensor to determine a response to said undesirable temperature condition; and executing the response to control said undesirable temperature condition as determined by the content of said memory structure.

16. The method of claim 15, further comprising the step of:
determining if said value representative of said die temperature exceeds said threshold value for said active thermal sensor for a plurality of sensing cycles before said reading of said memory structure to determine said response to control said undesirable temperature condition.

17. The method of claim 15, further comprising the step of,
determining if said value representative of said die temperature falls below said threshold value for said active thermal sensor for a plurality of sensing cycles before said reading of said memory structure to determine said response to control said undesirable temperature condition.

18. The method of claim 14, further comprising the steps of:
accessing a memory structure if said value representative of said die temperature from the active thermal sensor falls below said threshold value for the active thermal sensor to determine a response to said undesirable temperature condition; and
executing the response to control said undesirable temperature condition as determined by the content of said memory structure.

19. The method of claim 14, wherein said thermal sensor is embedded in said integrated circuit.

20. The method of claim 14, further comprising the step of, determining said threshold value with a calibration thermal sensor that operates independently of said active thermal sensor when said integrated circuit is in a powered down state.

21. The method of claim 20, wherein said threshold value represents said die temperature of said integrated circuit in said powered down state as determined by said calibration thermal sensor.

22. The method of claim 14, wherein said threshold value represents said die temperature of said integrated circuit when said integrated circuit is not clocked as determined by said calibration thermal sensor.

23. The method of claim 14, wherein said threshold value is determined for said active thermal sensor based on a location of said thermal sensor in said integrated circuit.

24. The method of claim 14, wherein a processor coupled to said thermal sensor performs said step of determining if said value from said active thermal sensor exceeds a threshold value for said active thermal sensor to detect the undesirable temperature condition of said integrated circuit wherein the undesirable temperature condition comprises one of an over-temperature condition and an under-temperature condition.

25. The method of claim 14, wherein said thermal sensor comprises an active integrated thermal sensor.

26. A temperature management system for an integrated circuit, comprising:
one or more thermal sensors to sense and report one or more temperature measurements from one or more locations located across a die area of the integrated circuit;
a control unit to determine from a reported temperature measurement one of at least three thermal states of the integrated circuit, and to manage the temperature of the integrated circuit if the control unit detects a temperature event from the one or more thermal sensors; and
a calibration thermal sensor that operates independently of the one or more thermal sensors to provide one or more temperature calibration values of the one or more thermal sensors, wherein the one or more temperature calibration values are for use in determination of the temperature event for each of the reported one or more temperature measurements from the one or more thermal sensors.

27. The temperature management system of claim 26, wherein the one or more thermal sensors are active thermal sensors embedded in the die of the integrated circuit.

28. The temperature management system of claim 26, wherein if the control unit detects said temperature event, the control unit determines a response to manage the temperature of the integrated circuit from a data value read from a memory structure.

29. The temperature management system of claim 26, wherein at least three thermal states comprise, an over-temperature state, an under-temperature state, and an operational state in which the control unit determines that the one or more temperature measurements are within a selected range.

* * * * *